United States Patent
Min et al.

(10) Patent No.: US 8,613,341 B2
(45) Date of Patent: Dec. 24, 2013

(54) PROTECTIVE DEVICE OF AUTOMOBILE DRIVER

(75) Inventors: Jeong Seon Min, Hwaseong-si (KR); Eun Sik Kim, Daegu (KR); Yang Rae Cho, Hwaseong-si (KR); Wi Sang Park, Ulsan (KR)

(73) Assignees: Hyundai Motor Company, Seoul (KR); Kia Motors Corp., Seoul (KR); Dong Hee Industrial Co., Ltd., Ulsan (KR)

( * ) Notice: Subject to any disclaimer, the term of this patent is extended or adjusted under 35 U.S.C. 154(b) by 0 days.

(21) Appl. No.: 13/494,560

(22) Filed: Jun. 12, 2012

(65) Prior Publication Data

US 2013/0133470 A1 May 30, 2013

(30) Foreign Application Priority Data

Nov. 29, 2011 (KR) .................. 10-2011-0125677

(51) Int. Cl.
*G05G 1/32* (2008.04)
*B60R 21/00* (2006.01)

(52) U.S. Cl.
USPC .................. 180/274; 74/512; 74/560

(58) Field of Classification Search
USPC .............. 180/274, 271; 74/512, 560
See application file for complete search history.

(56) References Cited

U.S. PATENT DOCUMENTS

| 8,196,695 | B2 * | 6/2012 | Kim et al. ............ 180/274 |
| 2005/0050980 | A1 * | 3/2005 | Park ..................... 74/512 |
| 2007/0137394 | A1 * | 6/2007 | Park ..................... 74/512 |
| 2012/0137823 | A1 * | 6/2012 | Kim et al. ............ 74/560 |

FOREIGN PATENT DOCUMENTS

JP         2008090381 A  *  4/2008

* cited by examiner

*Primary Examiner* — Keith Frisby
(74) *Attorney, Agent, or Firm* — Morgan, Lewis & Bockius LLP

(57) ABSTRACT

A protective device of an automobile driver can prevent driver's legs from being injured by a brake pedal as the brake pedal forcibly rotates forward when a collision accident occurs.

5 Claims, 6 Drawing Sheets

PROTECTIVE DEVICE OF AUTOMOBILE DRIVER

CROSS-REFERENCE TO RELATED APPLICATION

The present application claims priority of Korean Patent Application Number 10-2011-0125677 filed Nov. 29, 2011, the entire contents of which application is incorporated herein for all purposes by this reference.

BACKGROUND OF INVENTION

1. Field of Invention

The present invention relates to a protective device of an automobile driver, and more particularly, to a protective device of an automobile driver, and more particularly, to a protective device configured to prevent driver's legs from injured (an ankle spraining injury) by forcibly rotating a brake pedal toward the front of a vehicle when an collision accident occurs.

2. Description of Related Art

In general, a driver decreases a vehicle speed by stepping a brake pedal in order to prevent an accident of a moving vehicle, but collision and pileup accidents occur in a situation where a safety distance from a vehicle ahead is not sufficiently ensured.

In this case, when an engine room collapses due to large impact force and simultaneously, vehicle components mounted in the engine room is pushed to the rear of a vehicle body, a brake pedal 1 is pulled into a room as marked with an arrow M1 and rotates with one end of the pedal raised upward around a pedal hinge shaft 2 as marked with an arrow R1 as shown in FIG. 1.

Therefore, an ankle of a driver who steps the brake pedal 1 is subjected to a large injury in which the ankle is sprained with tipping backward by a rotating operation of the brake pedal 1.

Meanwhile, in FIG. 1, reference numeral 3 represents a dash panel, reference numeral 4 represents a pedal mounting bracket, reference numeral 5 represents a brake booster, and reference numeral 6 represents a push rod.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a protective device of an automobile driver configured to maximally prevent an injury of driver's legs by forcibly rotating a brake pedal toward the front of a vehicle when a component at an engine room side is pushed to the rear of a vehicle body to occupy a room space by impact force generated at a collision accident.

Various aspects of the present invention provide for a protective device of an automobile driver including a brake pedal in which an operating protrusion integrally protrudes forward on an outer peripheral surface of a portion coupled with a pedal hinge shaft while being coupled with a pedal mounting bracket through a pedal hinge shaft and a return spring to be flexibly rotated; a collision bracket rotatably coupled with the pedal mounting bracket spaced forward from the operating protrusion through a rotational shaft; and a pedal rotating device installed to connect a cowl bracket fixed to the pedal mounting bracket and the collision bracket to each other to forcibly rotate the brake pedal forward in contact with the operating protrusion when the pedal mounting bracket moves rearward or the cowl bracket moves rearward by collision energy generated when the collision accident occurs.

The cowl bracket may be fixedly installed on the top of the pedal mounting bracket through a bolt and a nut, and bolt holes having a slot shape opened rearward may be formed on a top surface of the pedal mounting bracket and a bottom surface of the cowl bracket, respectively so as to separate the pedal mounting bracket and the cowl bracket from each other when the collision accident occurs.

The pedal rotating device may include a top shaft fixed to the cowl bracket by penetrating both side surfaces of the cowl bracket; a bottom shaft installed by penetrating both side surfaces of the collision bracket to contact the operating protrusion when the collision bracket rotates around the rotational shaft; and a plurality of connection brackets connecting both ends of the top shaft and both ends of the bottom shaft, respectively.

A lower part of the collision bracket coupled with the bottom shaft may be positioned inside the pedal mounting bracket and an upper part of the collision bracket protrudes upward on the pedal mounting bracket based on the rotational shaft, the bottom shaft may be installed to integrally penetrate both side surfaces of the collision bracket and both side surfaces of the pedal mounting bracket, and a guide hole guiding movement of the bottom shaft may be formed on both side surfaces of the pedal mounting bracket when the collision bracket rotates around the rotational shaft.

The guide hole as a hole penetrated by the rotational shaft may have a circular arc shape along a rotational radius in which the bottom shaft rotates around the rotational shaft.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
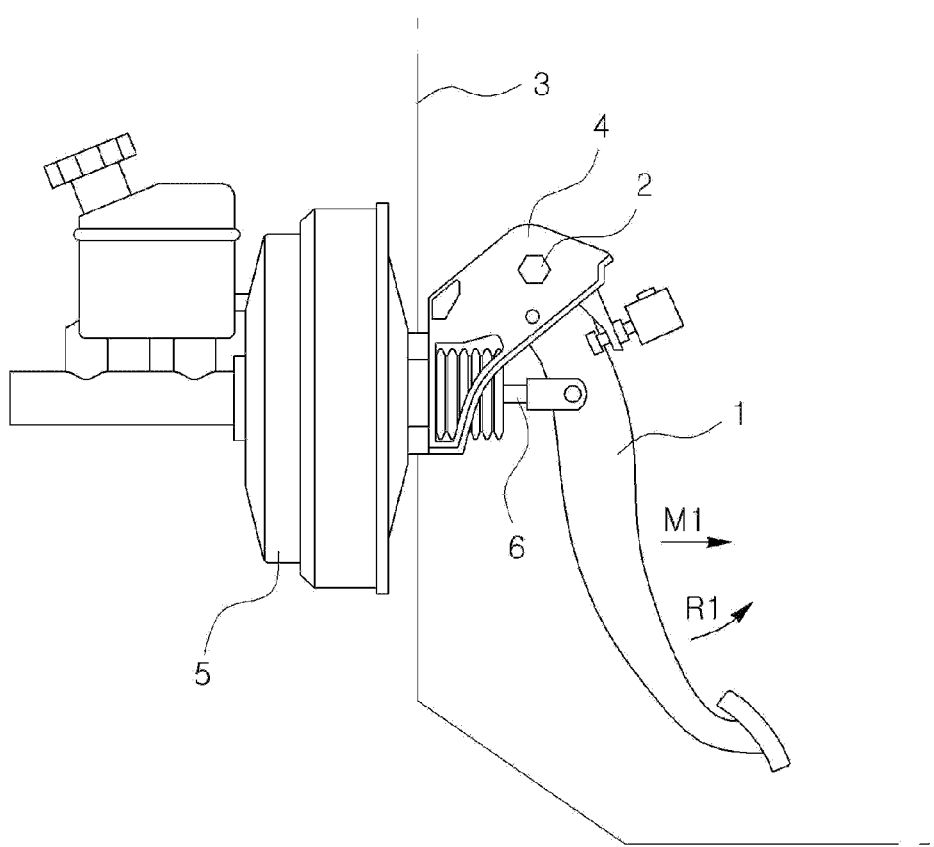
FIG. 1 is a side view for showing an installation state of a brake pedal assembly in the related art.
Figure 2:
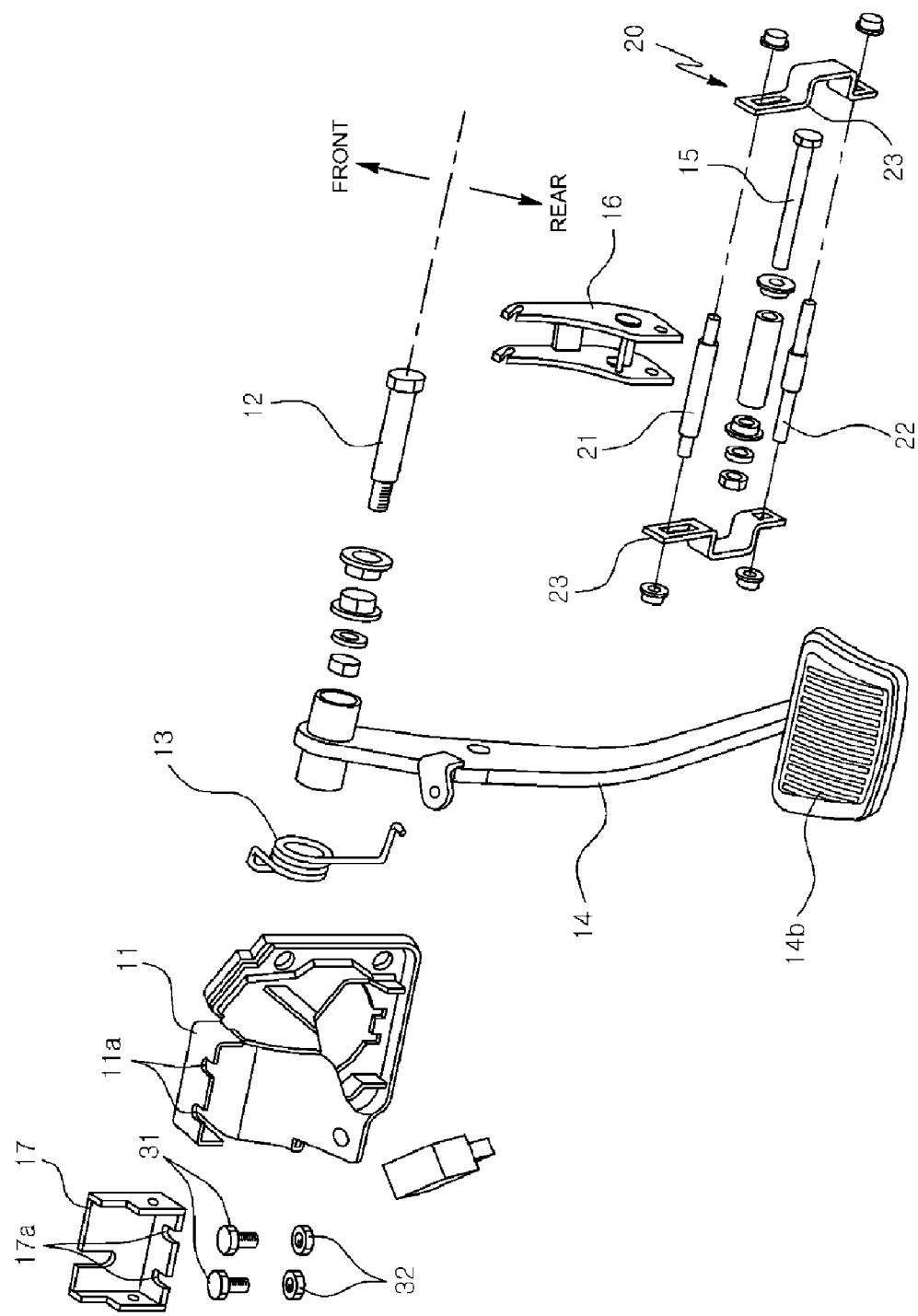
FIG. 2 is an exploded perspective view for showing a configuration of an exemplary protective device for an automobile driver according to the present invention.
Figure 3:
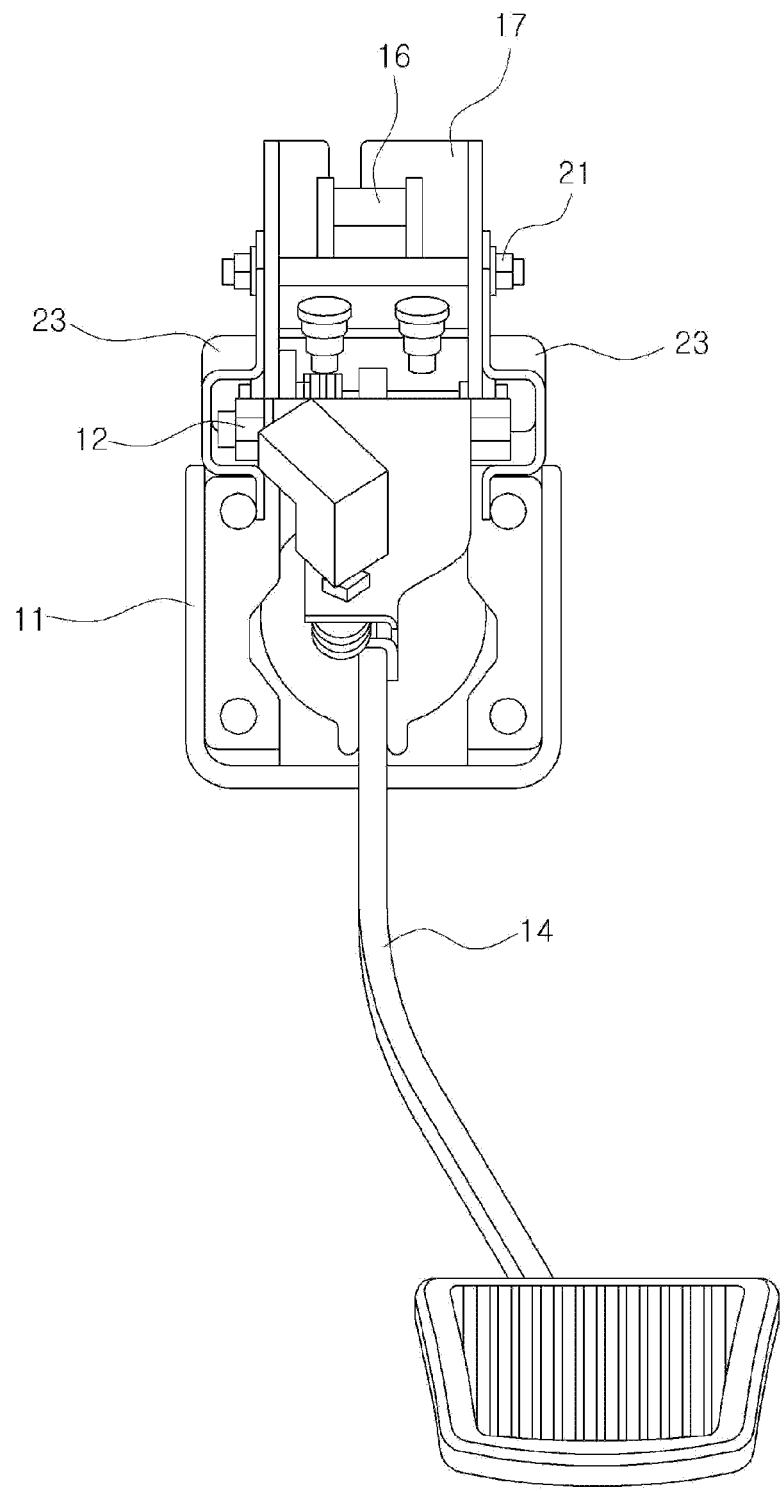
FIGS. 3 and 4 are a front view and a side view of an assembly state of FIG. 2.

It should be understood that the appended drawings are not necessarily to scale, presenting a somewhat simplified representation of various features illustrative of the basic principles of the invention.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The protective device of an automobile driver according to various embodiments of the present invention can maximally prevent driver's legs (an ankle, a knee, a shin, and the like) from being injured by an brake pedal when a collision accident occurs.

That is, the protective device of an automobile driver according to various embodiments of the present invention includes a brake pedal 14 in which an operating protrusion 14a integrally protrudes forward on an outer peripheral surface of a portion coupled with a pedal hinge shaft 12 while being coupled with a pedal mounting bracket 11 through a pedal hinge shaft 12 and a return spring 13 to be flexibly rotated, a collision bracket 16 rotatably coupled with the pedal mounting bracket 11 spaced forward from the operating protrusion 14a through a rotational shaft 15, and a pedal rotating device 20 installed to connect a cowl bracket 17 fixed to the pedal mounting bracket 11 and the collision bracket 16 to each other to forcibly rotate the brake pedal 14 forward in contact with the operating protrusion 14a when the pedal mounting bracket 11 moves rearward or the cowl bracket 17 moves rearward by collision energy generated when the collision accident occurs, as shown in FIGS. 2 to 6. One will appreciate that the brake pedal and the protrusion may be monolithically formed.

Herein, the pedal mounting bracket 11 is fixedly installed on a dash panel 18 and the cowl bracket 17 is fixedly installed on a cowl panel 19.

In addition, the brake pedal 14 is connected to a brake booster 5 through a push rod 6 as shown in FIG. 1.

Further, the cowl bracket 17 is fixedly installed on the top of the pedal mounting bracket 11 through a bolt 31 and a nut 32. Bolt holes 11a and 17a having a slot shape opened rearward are formed on a top surface of the pedal mounting bracket 11 and a bottom surface of the cowl bracket 17, respectively so as to separate the pedal mounting bracket 11 and the cowl bracket 17 from each other when the collision accident occurs.

Meanwhile, the pedal rotating device 20 includes a top shaft 21 fixed to the cowl bracket 17 by penetrating both side surfaces of the cowl bracket 17, a bottom shaft 22 installed by penetrating both side surfaces of the collision bracket 16 to contact the operating protrusion 14a when the collision bracket 16 rotates around the rotational shaft 15, and a plurality of connection brackets 23 connecting both ends of the top shaft 21 and both ends of the bottom shaft 22, respectively.

Herein, a lower part of the collision bracket 16 coupled with the bottom shaft 22 is positioned inside the pedal mounting bracket 11 and an upper part of the collision bracket 16 protrudes upward on the pedal mounting bracket 11 based on the rotational shaft 15.

As a result, the bottom shaft 22 is installed to integrally penetrate both side surfaces of the collision bracket 16 and both side surfaces of the pedal mounting bracket 11 and a guide hole 11b guiding movement of the bottom shaft 22 is formed on both side surfaces of the pedal mounting bracket 11 when the collision bracket 16 rotates around the rotational shaft 15.

The guide hole 11b is penetrated by the rotational shaft 15 has a circular arc shape along a rotational radius in which the bottom shaft 22 rotates around the rotational shaft 15.

Hereinafter, an operation of the protective device of an automobile driver according to various embodiments of the present invention will be described.

Figure 4:
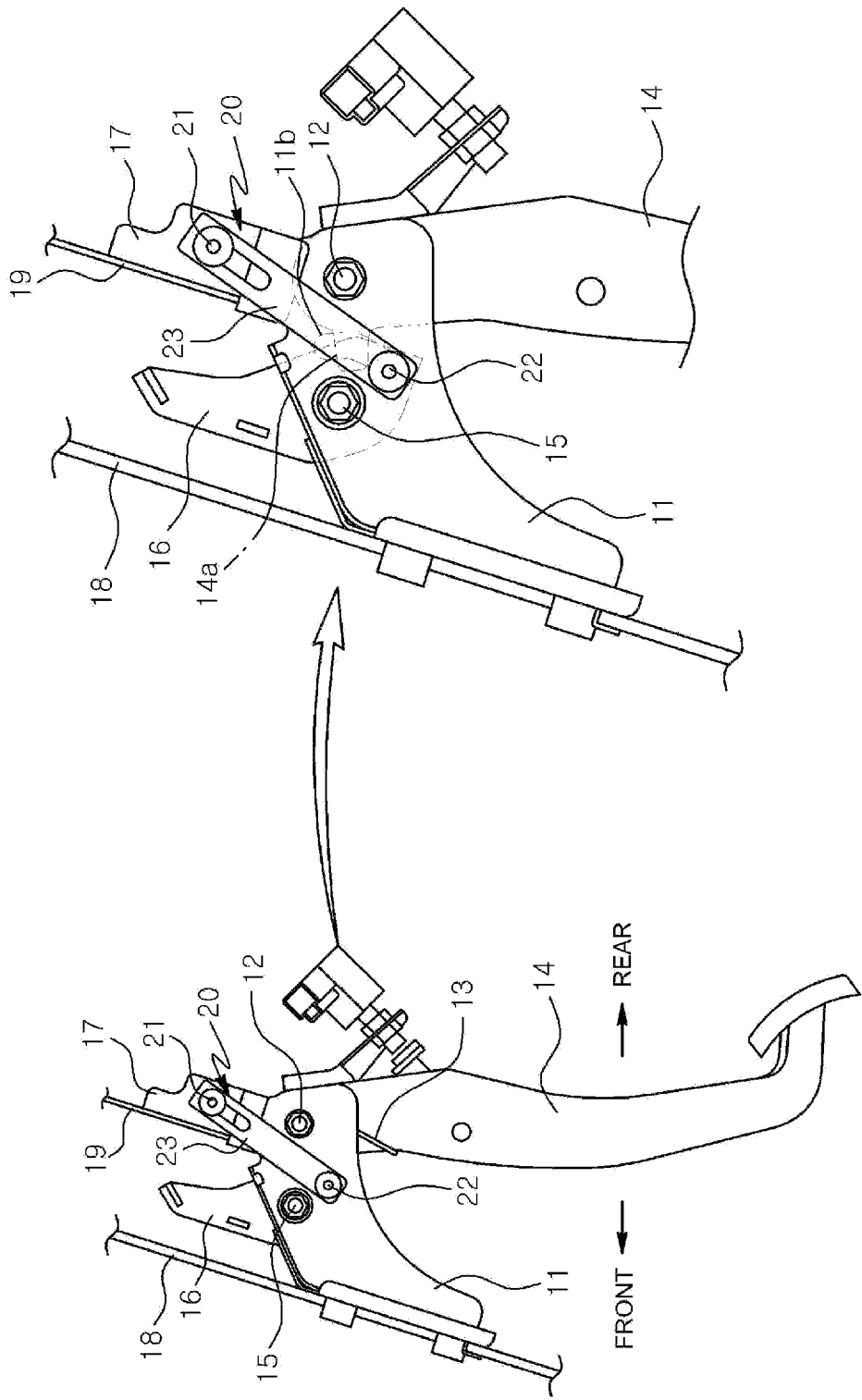

FIG. 4 shows a situation of the brake pedal 14 in a normal state in which the collision accident does not occur. When a driver steps the brake pedal 14, the brake pedal 14 rotates clockwise around the pedal hinge shaft 12 and rotational force of the brake pedal 14 to a brake booster 5 through a push rod 6 shown in FIG. 1, such that a brake device of a vehicle performs a normal operation to generate braking force.

When the brake pedal 14 rotates clockwise in the normal state shown in FIG. 4, the operating protrusion 14a provided in the brake pedal 14 may smoothly rotate as an interference situation with the bottom shaft 22 does not occur.

Figure 5:
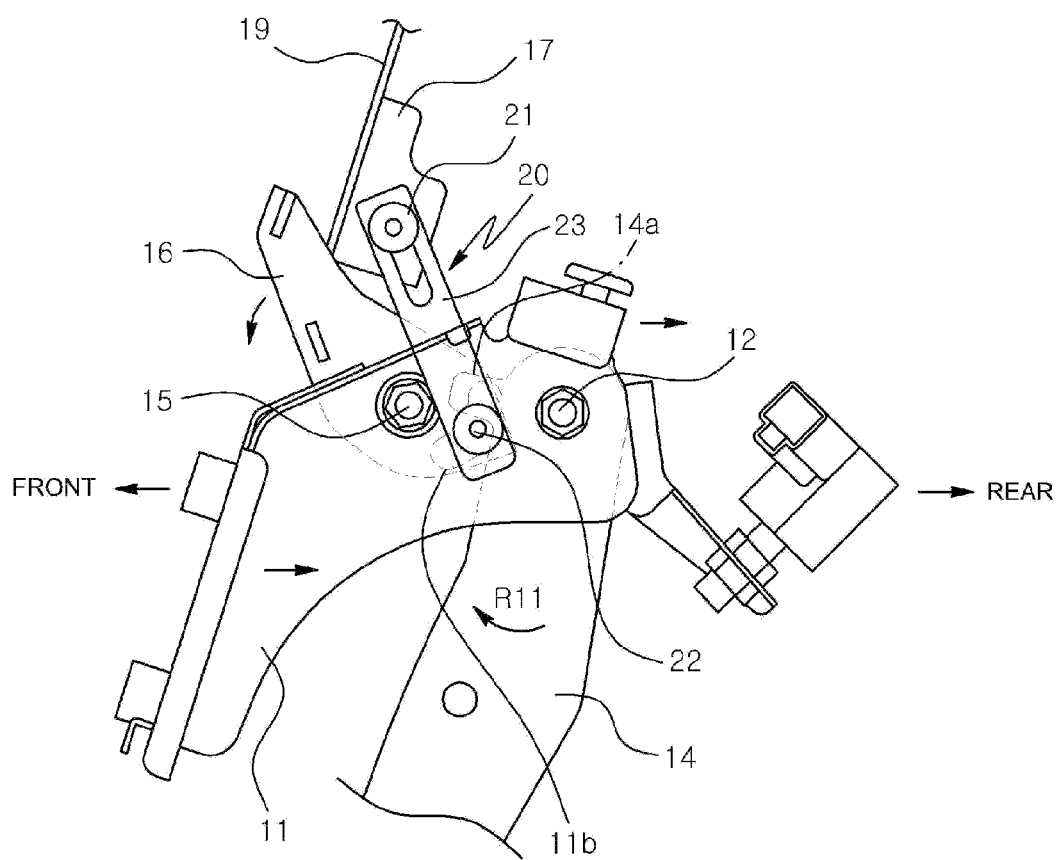
FIGS. 5 and 6 are diagrams for describing an operational state of an exemplary protective device of an automobile driver according to the present invention.

In addition, FIG. 5 shows a situation in which is the dash panel 18 collapses by the collision energy generated at the collision accident and the pedal mounting bracket 11 coupled to the dash panel 18 is pushed into the rear side to occupy the room space.

As described above, when the pedal mounting bracket 11 is pushed into the rear side, the bracket pedal 14 and the collision bracket 16 coupled with the pedal mounting bracket 11 are also pushed rearward to move together.

In this case, the cowl bracket 17 is decoupled from the pedal mounting bracket 11, that is, as the bolt 31 coupled onto the top of the pedal mounting bracket 11 moves rearward together with the pedal mounting bracket 11, the bolt 31 disengages from the bolt hole 17a of the cowl bracket 17, and as a result, the cowl bracket 17 and the pedal mounting bracket 11 are decoupled from each other.

In addition, when the collision bracket 16 is pushed rearward together with the pedal mounting bracket 11 to move, the top of the collision bracket 16 rotates counterclockwise around the rotational shaft 15 in contact with the cowl bracket 17 and the bottom shaft 22 moves up along the guide hole 11b.

When the bottom shaft 22 moves up along the guide hole 11b, the bottom shaft 22 lifts up the operating protrusion 14a in contact with the operating protrusion 14a, and as a result, the brake pedal 14 rotates clockwise around the pedal hinge shaft 12 as marked with the arrow R11 of FIG. 5. As a result, the brake pedal 14 is distant from the driver's legs as a lower end where a pedal 14b is provided forcibly rotates to the front side of the vehicle.

As described above, when the brake pedal 14 forcibly rotates forward at the collision accident, the knee and the shin are not hit by the pedal 14b while the driver does not step the pedal 14b, and as a result, the driver can be maximally prevented from being injured by the brake pedal 14.

Further, when the driver steps the pedal 14b, the ankle of the driver can be prevented from being strained. Therefore, in this case, an injury in which the ankle of the driver is bent can be prevented.

Figure 6:
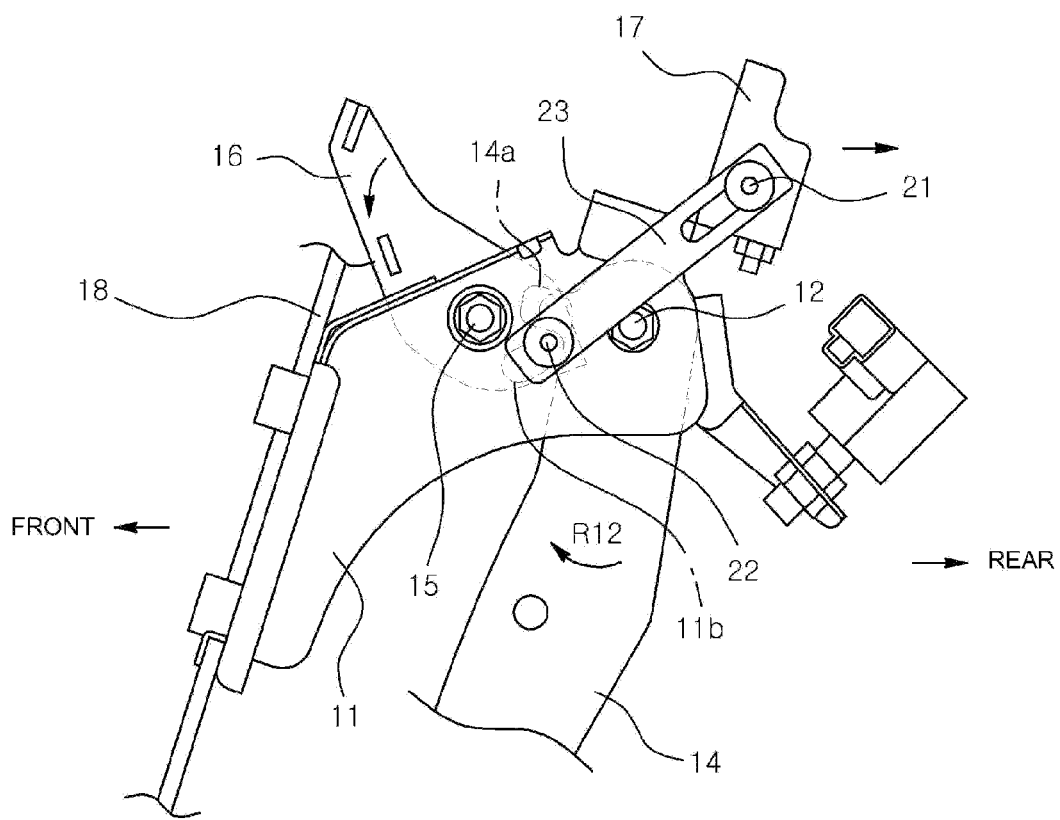

In addition, in FIG. 6, the cowl panel 19 collapses by the collision energy generated at the collision accident and the cowl bracket 17 coupled to the cowl panel 19 is pulled into the rear side to occupy the room space.

As described above, when the cowl bracket 17 is pulled rearward to move, the cowl bracket 17 is decoupled from the pedal mounting bracket 11, that is, as the bolt 31 coupled onto the bottom surface of the cowl bracket 17 moves rearward together with the cowl bracket 17, the bolt 31 disengages from the bolt hole 11a of the pedal mounting bracket 11, and as a result, the cowl bracket 17 and the pedal mounting bracket 11 are decoupled from each other.

In addition, when the cowl bracket 17 is pulled rearward to move, the connection bracket 23 receives force to move rearward together with the cowl bracket 17, and as a result, the bottom shaft 22 moves up along the guide hole 11b and the collision bracket 16 rotates counterclockwise around the rotational shaft 15 by moving the bottom shaft 22.

Meanwhile, when the bottom shaft 22 moves up along the guide hole 11b, the bottom shaft 22 lifts up the operating protrusion 14a in contact with the operating protrusion 14a, and as a result, the brake pedal 14 rotates clockwise around the pedal hinge shaft 12 as marked with the arrow R12 of FIG. 6. As a result, the brake pedal 14 is distant from the driver's legs as the lower end where a pedal 14b is provided forcibly rotates to the front of the vehicle.

As described above, when the brake pedal 14 forcibly rotates forward at the collision accident, the knee and the shin are not hit by the pedal 14b while the driver does not step the pedal 14b, and as a result, the driver can be maximally prevented from being injured by the brake pedal 14.

Further, when the driver steps the pedal 14b, the ankle of the driver can be prevented from being strained. Therefore, in this case, an injury in which the ankle of the driver is bent can be prevented.

As described above, in the protective device of an automobile driver according to various embodiments of the present invention, the brake pedal 14 forcibly rotates forward when the collision accident occurs to maximally prevent the driver's legs from being injured by the brake pedal 14, and as a result, stability of the vehicle can be improved and merchantability of the vehicle can be improved.

According to various embodiments of the present invention, a brake pedal is forcibly rotated to the front when a collision accident occurs to maximally prevent an injury of driver's legs by a brake pedal.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A protective device of an automobile driver, comprising:
   a brake pedal pivotally coupled to a pedal mounting bracket by a pedal hinge shaft, the brake pedal including an operating protrusion integrally protruding forward from an outer peripheral surface of the brake pedal;
   a return spring interconnecting the operating protrusion and the pedal mounting bracket;
   a collision bracket rotatably coupled with the pedal mounting bracket via a rotational shaft, the collision bracket being spaced forward from the operating protrusion; and
   a pedal rotating device operably connecting a cowl bracket fixed to the pedal mounting bracket and the collision bracket to forcibly rotate the brake pedal forward when the pedal mounting bracket moves rearward or the cowl bracket moves rearward by collision energy generated during a collision accident.

2. The protective device of an automobile driver of claim 1, wherein:
   the cowl bracket is fixedly installed on a top of the pedal mounting bracket through a bolt and a nut, and
   bolt holes having a slot shape opening rearward and formed on a top surface of the pedal mounting bracket and a bottom surface of the cowl bracket, respectively, so as to separate the pedal mounting bracket and the cowl bracket from each other when the collision accident occurs.

3. The protective device of an automobile driver of claim 1, wherein the pedal rotating device includes:
   a top shaft fixed to the cowl bracket by penetrating both side surfaces of the cowl bracket;
   a bottom shaft installed by penetrating both side surfaces of the collision bracket to contact the operating protrusion when the collision bracket rotates around the rotational shaft; and
   a plurality of connection brackets connecting both ends of the top shaft and both ends of the bottom shaft, respectively.

4. The protective device of an automobile driver of claim 3, wherein:
   a lower part of the collision bracket coupled with the bottom shaft is positioned inside the pedal mounting bracket and an upper part of the collision bracket protrudes upward on the pedal mounting bracket based on the rotational shaft,
   the bottom shaft is installed to integrally penetrate both side surfaces of the collision bracket and both side surfaces of the pedal mounting bracket, and
   guide holes guiding movement of the bottom shaft are formed on both side surfaces of the pedal mounting bracket to guide the bottom shaft when the collision bracket rotates around the rotational shaft.

5. The protective device of an automobile driver of claim 4, wherein the guide holes are penetrated by the rotational shaft and have a circular arc shape along a rotational radius in which the bottom shaft rotates around the rotational shaft.

* * * * *